(12) United States Patent
Kasai et al.

(10) Patent No.: US 10,639,981 B2
(45) Date of Patent: May 5, 2020

(54) VEHICLE BODY STRUCTURE

(71) Applicant: TOYOTA JIDOSHA KABUSHIKI KAISHA, Toyota-shi, Aichi-ken (JP)

(72) Inventors: Satoshi Kasai, Nagoya (JP); Akihiro Yamada, Okazaki (JP); Kazuma Otoguro, Toyota (JP); Akira Nishino, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/272,199

(22) Filed: Feb. 11, 2019

(65) Prior Publication Data

US 2019/0275873 A1  Sep. 12, 2019

(30) Foreign Application Priority Data

Mar. 7, 2018 (JP) ................. 2018-041077

(51) Int. Cl.
 *B60K 1/04* (2019.01)
 *B60L 50/60* (2019.01)
 *B62D 25/20* (2006.01)
 *B62D 21/15* (2006.01)
 *H01M 2/10* (2006.01)

(52) U.S. Cl.
 CPC ............... *B60K 1/04* (2013.01); *B60L 50/66* (2019.02); *B62D 21/155* (2013.01); *B62D 25/20* (2013.01); *B60K 2001/0438* (2013.01); *H01M 2/1083* (2013.01); *H01M 2220/20* (2013.01)

(58) Field of Classification Search
 CPC ... B60K 1/04; B60K 2001/0438; B60L 50/66; B60L 50/60; B60L 50/50; B62D 21/155; B62D 25/20; B62D 25/2009; H01M 2/1083; H01M 2/1077; H01M 2/1072; H01M 2220/20
 USPC ........................................... 180/68.5
 See application file for complete search history.

(56) References Cited

U.S. PATENT DOCUMENTS

| 9,227,582 | B2 * | 1/2016 | Katayama | ................. B60K 1/04 |
| 9,937,781 | B1 * | 4/2018 | Bryer | ........................ B60K 1/04 |
| 10,112,470 | B2 * | 10/2018 | Hamilton | ................. B60K 1/04 |
| 2012/0160584 | A1 | 6/2012 | Nitawaki | |

(Continued)

FOREIGN PATENT DOCUMENTS

| DE | 10 2016 208 053 A1 | 11/2017 |
| EP | 1 939 028 A1 | 7/2008 |

(Continued)

*Primary Examiner* — John D Walters
(74) *Attorney, Agent, or Firm* — Oliff PLC

(57) ABSTRACT

A vehicle body structure includes: a floor panel of a floor of a vehicle interior; a left floor member having a left inclined portion inclined toward the outer side of a vehicle from the front of the vehicle toward the rear of the vehicle when viewed from the top, and a right floor member having a right inclined portion inclined toward the outer side of the vehicle from the front of the vehicle toward the rear of the vehicle when viewed from the top; a battery support frame closer to the lower side of the vehicle than the left and right floor members; and a fastening unit for fixing the battery support frame to the floor panel through the left and right floor members. The battery support frame is fastened to the floor panel at the left inclined portion and the right inclined portion through the fastening unit.

6 Claims, 6 Drawing Sheets

(56) References Cited

U.S. PATENT DOCUMENTS

2017/0305249 A1    10/2017   Hara
2018/0043936 A1    2/2018   Tsukada et al.
2019/0074561 A1    3/2019   Schwarzer et al.

FOREIGN PATENT DOCUMENTS

JP    2014-12524 A    1/2014
JP    2017-193288 A    10/2017

\* cited by examiner

VEHICLE BODY STRUCTURE

CROSS REFERENCE TO RELATED APPLICATION

The entire disclosure of Japanese Patent Application No. 2018-041077 filed on Mar. 7, 2018, including the specification, claims, drawings, and abstract, is incorporated herein by reference in its entirety.

TECHNICAL FIELD

The present disclosure generally relates to a vehicle body structure, and more particular to a vehicle body structure including a side member having an inclined portion that is inclined toward the outer side of a vehicle from the front of the vehicle toward the rear of the vehicle, when viewed from the top.

BACKGROUND

A vehicle under body which forms the floor-side framework of the vehicle has a pair of side members, which extend in the front-rear direction of the vehicle, on both sides with respect to the width direction of the vehicle in order to impart impact resistance or the like. Regarding the pair of side members, which extend generally straight along the front-rear direction of the vehicle when viewed from the top, for example, in order to widen the battery installation space, the width of the pair of side members is increased in the width direction of the vehicle.

For example, JP 2014-12524 A describes a structure in which the width along the width direction of the vehicle of a pair of side members, which extend in the front-rear direction and are provided on both sides of the body of an electric car, increases from the front of the vehicle toward the vehicle interior, and a battery pack is disposed in this wide space. Here, a battery cross member mounted with the right and left ends of the pair of side members supports the bottom surface of the battery pack. The battery cross member is composed of a metal thin plate in a lattice shape in which a portion extending in the width direction of the vehicle and a portion extending in the front-rear direction of the vehicle are combined with each other.

When a vehicle receives an impact due to, for example, front collision, the pair of side members extending in the front-rear direction and provided on both sides of the vehicle body deform and, depending on the circumstances, the vehicle interior space may significantly narrow. In particular, if the distance between the pair of side members is increased in the width direction of the vehicle, the side members are curved, being inclined toward the outer side of the vehicle from the front of the vehicle toward the rear of the vehicle when viewed from the top, and may be bent at the inflection point of the curve when receiving an impact. In the side members extending in the front-rear direction of the vehicle, the section including the inclined portion is a floor side member. When a floor side member is referred to as a floor member, a vehicle body structure is required in which, in a pair of floor members, the impact resistance is improved in the inclined portion inclined toward the outer side of the vehicle from the front of the vehicle toward the rear of the vehicle, when viewed from the top.

SUMMARY

A vehicle body structure according to the present disclosure includes: a floor panel of a floor of a vehicle interior; a left floor member having a left inclined portion inclined toward the outer side of a vehicle from the front of the vehicle toward the rear of the vehicle, when viewed from the top, and a right floor member having a right inclined portion inclined toward the outer side of the vehicle from the front of the vehicle toward the rear of the vehicle, when viewed from the top; a battery support frame closer to the lower side of the vehicle than the left floor member and the right floor member; and a fastening unit for fixing the battery support frame to the floor panel through the left floor member and the right floor member. The battery support frame is fastened to the floor panel at the left inclined portion and the right inclined portion through the fastening unit.

According to the above-described structure, the left inclined portion and the right inclined portion which are easily bent when receiving an impact such as front collision are sandwiched between the floor panel and the battery support frame and fixed with the fastening unit. The left inclined portion and the right inclined portion are connected to each other through the rigidity of the battery support frame, thereby improving the impact resistance of the inclined portions of the floor members.

In the vehicle body structure according to the present disclosure, the left inclined portion is preferably inclined toward the outer side of the vehicle, between an inclined left front end on the front side of the vehicle and an inclined left rear end on the rear side of the vehicle, and the right inclined portion is preferably inclined toward the outer side of the vehicle, between an inclined right front end on the front side of the vehicle and an inclined right rear end on the rear side of the vehicle, the battery support frame is preferably fixed to the left inclined portion at the inclined left front end, an inclined left intermediate point between the inclined left front end and the inclined left rear end, and the inclined left rear end, and the battery support frame is preferably fixed to the right inclined portion at the inclined right front end, an inclined right intermediate point between the inclined right front end and the inclined right rear end, and the inclined right rear end.

According to the above-described structure, three points, namely the front ends, intermediate points, and rear ends of the left inclined portion and the right inclined portion which are easily bent when receiving an impact such as front collision, are sandwiched between the floor panel and the battery support frame, and fixed with the fastening unit. This improves the impact resistance in almost the entire area of the inclined portions of the floor members.

In the vehicle body structure according to the present disclosure, the battery support frame preferably includes: a first cross member having a left end portion fixed to the inclined left front end, and a right end portion fixed to the inclined right front end; a second cross member having a left end portion fixed to the inclined left intermediate point, and a right end portion fixed to the inclined right intermediate point; a third cross member having a left end portion fixed to the inclined left rear end, and a right end portion fixed to the inclined right rear end; and multiple straight members fixed to the first cross member, the second cross member, and the third cross member and extending in the front-rear direction of the vehicle.

According to the above-described structure, three cross members and multiple straight members are fixed to each other, forming a truss structure. The truss structure has higher flexural rigidity than a simple stick or plate. With the battery support frame having a truss structure, the impact resistance of the inclined portions which are easily bent when receiving an impact such as front collision is improved.

In the vehicle body structure according to the present disclosure, the left floor member and the right floor member are preferably each a flanged member structure having a hat shape that has, in cross section, a both side flanged groove extending in the front-rear direction of the vehicle, and preferably has a fastening through hole in a groove bottom portion, both side flanges being fixed to the floor panel, and the fastening unit preferably includes: a flanged holder having the hat shape that has, in cross section, a both side flanged groove extending in a direction orthogonal to a direction in which the groove of the flanged member structure extends, with the both side flanges being fixed to the groove bottom portion of the flanged member structure; and a tube nut that is disposed in a holder space surrounded by a groove wall portion of the flanged holder and a groove wall portion of the flanged member structure and has a female thread portion along an axial direction, the tube nut preferably having an upper end portion fixed to a groove bottom portion of the flanged holder, and a lower end portion fixed to the groove bottom portion of the flanged member structure.

According to the above-described structure, the tube nut is disposed in the holder space surrounded by the groove wall portion of the tube nut holder and the groove wall portion of the flanged member structure, thereby preventing the tube nut from being inclined by an external force or the like. Use of a fastening unit with this structure allows the floor members to be firmly fixed between the floor panel and the battery support frame, thereby improving the impact resistance.

ADVANTAGEOUS EFFECTS OF INVENTION

With the above-described vehicle body structure, in the pair of floor members, the impact resistance is improved in the inclined portion inclined toward the outer side of the vehicle from the front of the vehicle toward the rear of the vehicle, when viewed from the top.

BRIEF DESCRIPTION OF THE DRAWINGS

Embodiments of the present disclosure will be described based on the following figures, wherein:

FIG. 6 is a diagram showing the state after reception of the front collision.

DESCRIPTION OF EMBODIMENTS

Figure 1A:
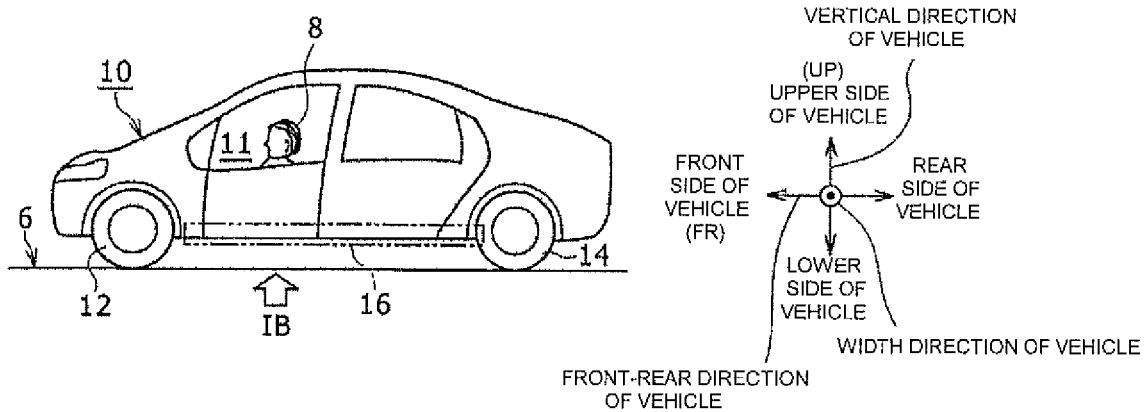
FIG. 1A is a diagram showing the installation position of a large-capacity battery related to a vehicle to which a vehicle body structure according to an embodiment is applied.

Embodiments of the present disclosure will now be described in detail with reference to the accompanying drawings. In the following description, the vehicle is divided into a front section, a vehicle interior region, and a rear section, the front section has a front member, the rear section has a rear member, and the vehicle interior region therebetween has a floor member, but, this is merely illustrative for the description. The vehicle is not necessarily divided into the front section, the vehicle interior region, and the rear section as long as it has a left floor member and a right floor member which have inclined portions inclined toward the outer side of the vehicle from the front of the vehicle toward the rear of the vehicle, when viewed from the top of the vehicle body. In the following description, the vehicle is left-hand drive and, in the event of front collision, receives an impact by offsetting toward the left front of the vehicle. However, this is merely illustrative for the description. The present disclosure is also applicable to right-hand drive vehicles.

The shapes and the like described below are merely illustrative for description and can be changed as appropriate depending on the specifications of the vehicle body structure and the like. Moreover, regarding the description below, the same components are denoted by the same reference numeral in all the drawings and overlapping description will be omitted.

FIG. 1A is a side view of a vehicle 10. In each drawing, the front-rear direction of the vehicle, the vertical direction of the vehicle, and the width direction of the vehicle are shown as appropriate. Regarding the front-rear direction of the vehicle, the direction represented by FR indicates the direction toward the front of the vehicle, and the opposite direction indicates the direction toward the rear of the vehicle. Regarding the vertical direction of the vehicle, the direction represented by UP indicates the upward direction of the vehicle with respect to a road surface 6, and the opposite direction indicates the downward direction of the vehicle toward the road surface 6. Regarding the width direction of the vehicle, when viewed from the user 8 who is in the vehicle interior 11 of the vehicle 10 and faces the front of the vehicle 10, the right side is on the right of the vehicle 10, and the left side is on the left of the vehicle 10.

FIG. 1A corresponds to the left side view of the vehicle 10, showing the left front wheel 12 and the left rear wheel 14 of the vehicle 10. A large-capacity battery 16 is disposed across almost the entire area under the floor of the vehicle 10.

Figure 1B:
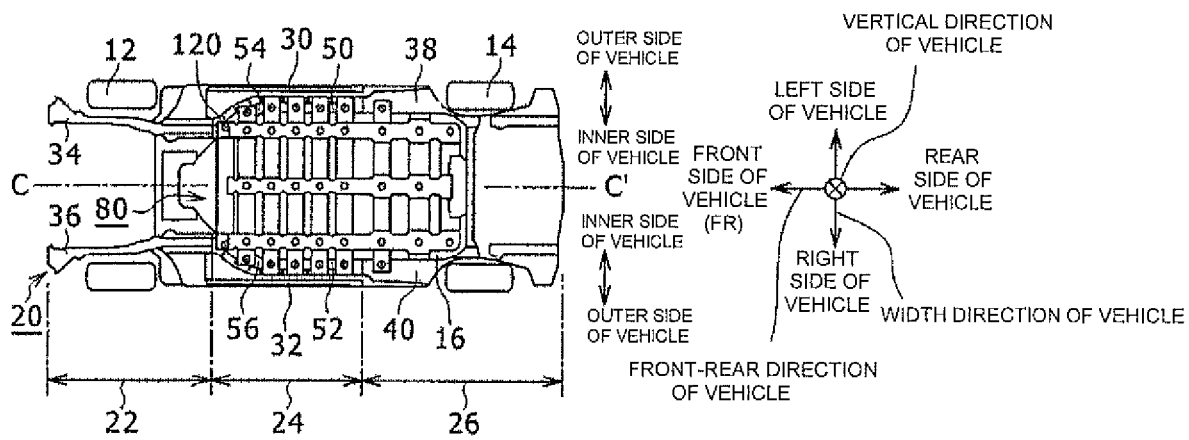
FIG. 1B is a bottom view of the vehicle seen from the direction IB of FIG. 1A.

FIG. 1B is the bottom view of the vehicle body structure 20 seen from the direction IB of the vehicle 10 shown in FIG. 1A. The direction IB is a direction toward the upper side of the vehicle from the lower side of the vehicle. Here, the vehicle body structure 20 is a structure related to the under body, of the structure related to the body of the vehicle 10.

The components of the vehicle body structure 20 are arranged symmetrically about the center axis C-C' extending along the front-rear direction of the vehicle. The side C is the front of the vehicle, and the side C' is the rear of the vehicle. When the width direction of the vehicle is referred to ignoring the difference between the left of the vehicle and the right of the vehicle, the direction toward the outer side of the vehicle 10 from the center line C-C' is referred to as the outer side of the vehicle, and the direction toward the center line C-C' is referred to as the inner side of the vehicle. In the following description, the vehicle 10 is left-hand drive and receives an offset impact and the like on its left.

The vehicle body structure 20 is roughly divided into, along the front-rear direction of the vehicle, the front structure 22 located on the front of the vehicle, the vehicle interior structure 24 located under the vehicle interior 11, and the rear structure 26 located on the rear of the vehicle. Since the inclined portion of each side member, which will be described later, is in the vehicle interior structure 24, the vehicle interior structure 24 in particular, of the vehicle body structure 20, will be described below.

A floor panel 28 (see FIG. 3) is a panel member constituting the floor of the vehicle interior 11. In the vehicle body structure 20, it is the member closest to the upper side of the vehicle. The components of the vehicle body structure 20 are located closer to the lower side of the vehicle than the floor panel 28 unless otherwise specified. In FIG. 1B, the floor panel 28 is barely seen behind a battery support frame 80, the large-capacity battery 16, and the like.

A left rocker 30 and a right rocker 32 extend along the front-rear direction of the vehicle on the lower sides of the doors of the vehicle 10. The left end portion of the floor panel 28 is fixed to the left rocker 30, and the right end portion of the floor panel 28 is fixed to the right rocker 32. Fixing here means to connect fixedly. Welding is used as fixing means, and screw fastening using a bolt and a nut, and a bolt and a screw hole is used depending on the fixing spot. The same applies to "fixing" described below.

The members arranged on the inner side of the vehicle with respect to the left rocker 30 and the right rocker 32 respectively and extending in the front-rear direction of the vehicle are called side members. Among the side members, portions of the front structure 22 are a left front member 34 and a right front member 36. Among the side members, portions of the rear structure 26 are a left rear member 38 and a right rear member 40. Among the side members, portions of the vehicle interior structure 24 are a left floor side member 50 and a right floor side member 52. The left floor side member 50 will be hereinafter referred to as a left floor member 50 and the right floor side member 52 will be hereinafter referred to as a right floor member 52.

The front end portion of the left floor member 50 is fixed to the left front member 34, and the rear end portion thereof is fixed to the left rear member 38. The left floor member 50 has a left inclined portion 54 which is inclined toward the outer side of the vehicle from the front of the vehicle toward the rear of the vehicle. Similarly, the front end portion of the right floor member 52 is fixed to the right front member 36 and a rear end portion thereof is fixed to the right rear member 40. The right floor member 52 has a right inclined portion 56 inclined toward the outer side of the vehicle from the front of the vehicle toward the rear of the vehicle. With the left inclined portion 54 and the right inclined portion 56, the distance between the left floor member 50 and the right floor member 52 increases in the width direction from the front end portion toward the vehicle interior 11. The large-capacity battery 16 having a larger width than a conventional battery is disposed taking advantage of the expanded region.

When the distance between the left floor member 50 having the left inclined portion 54 and the right floor member 52 having the right inclined portion 56 is increased in the width direction of the vehicle, the left floor member 50 and the right floor member 52 are curved, being inclined toward the outer side of the vehicle from the front of the vehicle toward the rear of the vehicle when viewed from the top. Since the components of the vehicle body structure 20 are arranged symmetrically about the center line C-C' along the front-rear direction of the vehicle, when viewed either from the upper side of the vehicle or from the IB side, the positional relationship therebetween is the same on the outer side of the vehicle and the inner side of the vehicle, that is, the positional relationship therebetween is the same on the left side and right side of the vehicle. Accordingly, in the vehicle body structure 20, the top view and the bottom view are the same.

The battery support frame 80 is a member which is provided more on the lower side of the vehicle than the left floor member 50 and the right floor member 52, and supports the large-capacity battery 16 disposed under the floor panel 28.

The battery support frame 80 is fixed to the floor panel 28 through the left floor member 50 and the right floor member 52 with multiple fastening units. The multiple fastening units are represented by the black dots outlined in white circles. In FIG. 1B, one of the multiple fastening units is denoted by a reference numeral representing a fastening unit 120. In other words, the left floor member 50 and the right floor member 52 are fixed using the multiple fastening units, being sandwiched between the floor panel 28 and the battery support frame 80. The left floor member 50 and the right floor member 52 are connected to each other through the rigidity of the battery support frame 80. This improves the impact resistances of the left inclined portion 54 of the left floor member 50 and the right inclined portion 56 of the right floor member 52 which are easily bent when receiving an impact such as front collision.

Figure 2:
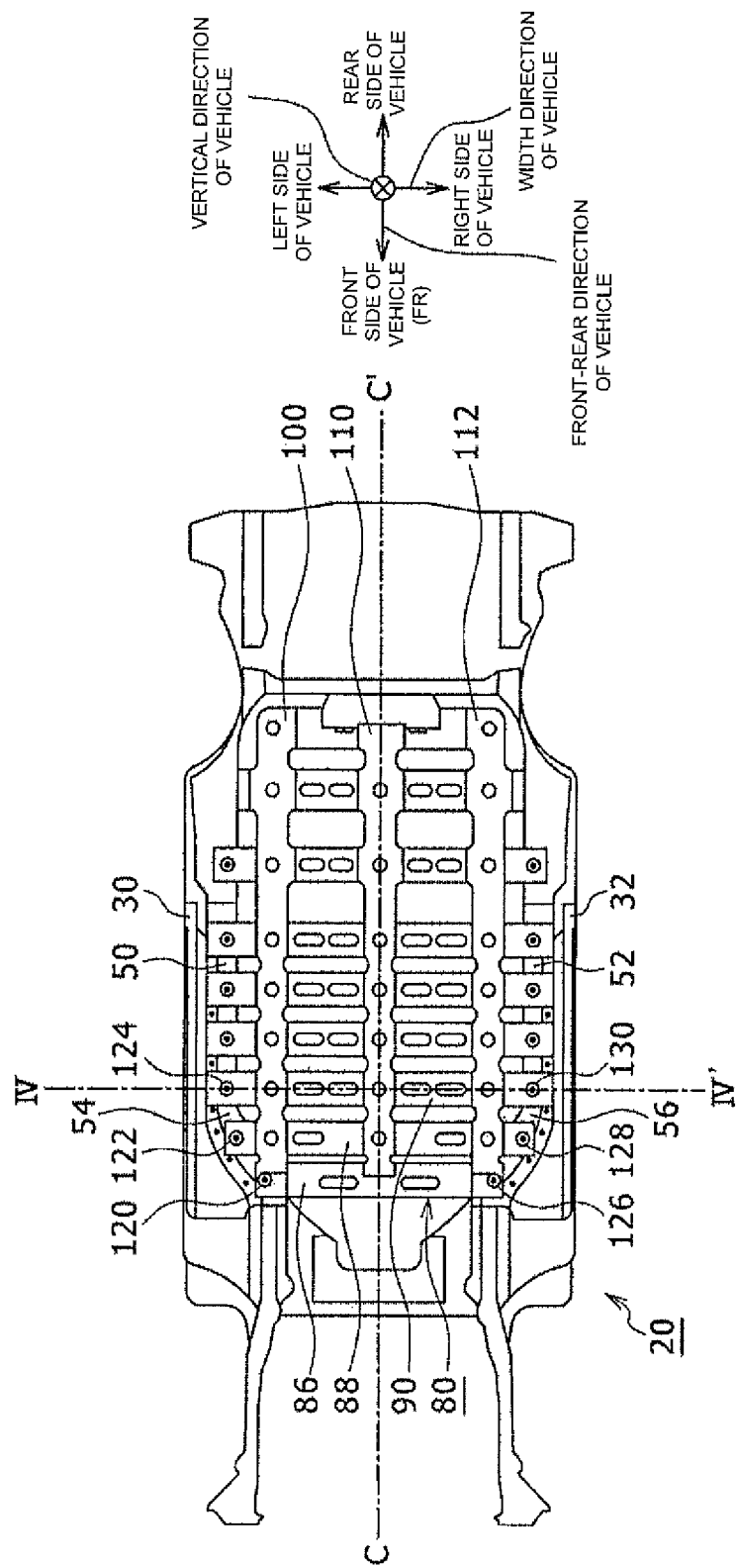
FIG. 2 is an enlarged view of FIG. 1B.
Figure 3:
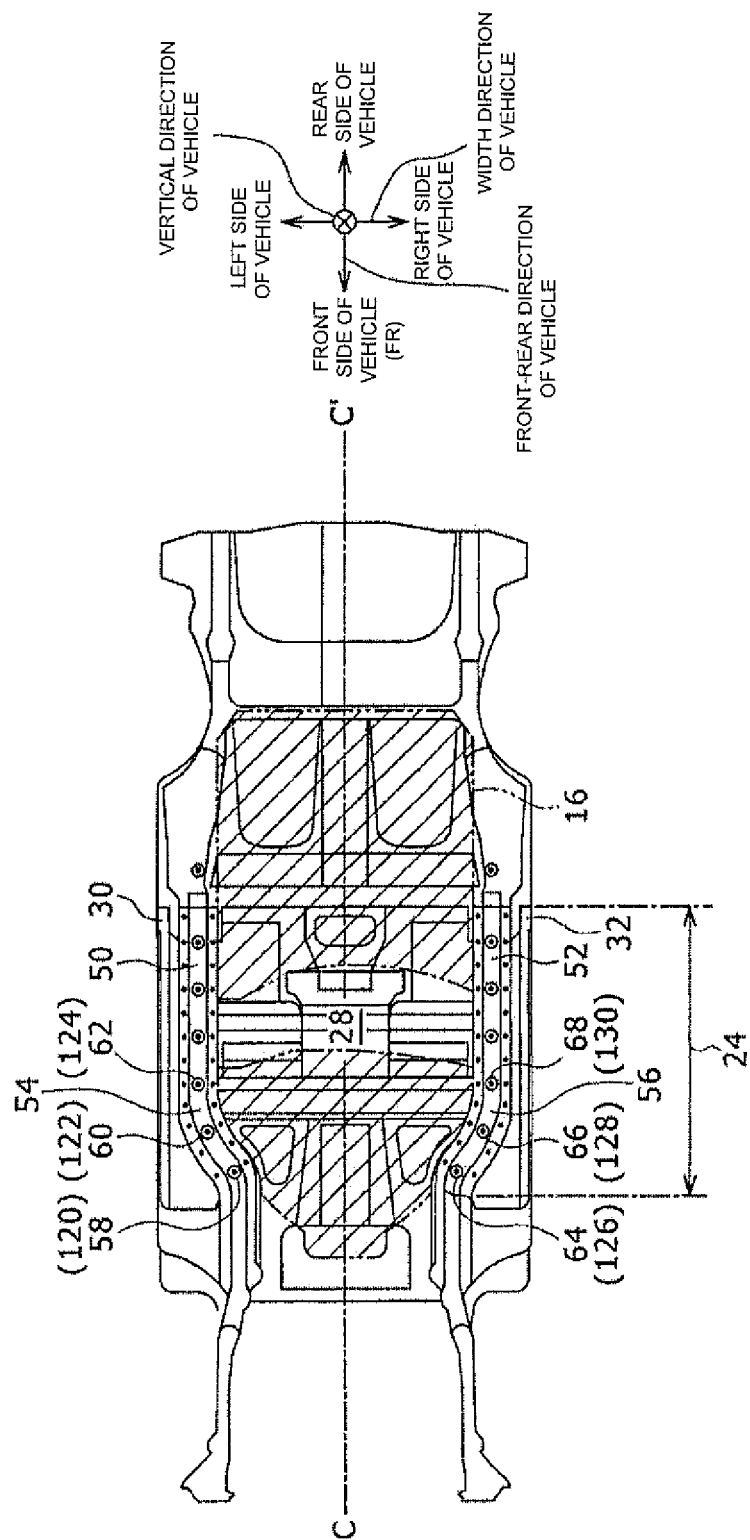
FIG. 3 is a diagram showing a floor panel, excluding the battery support frame and the like from FIG. 2.
Figure 4:
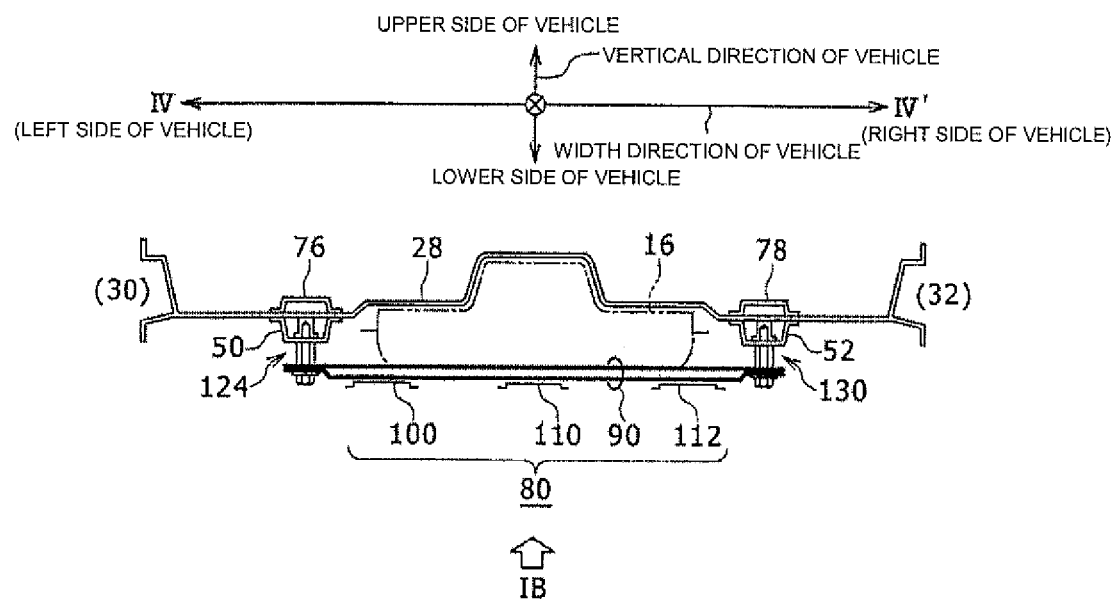
FIG. 4 is a cross-sectional view along line IV-IV' in FIG. 2.
Figure 5:
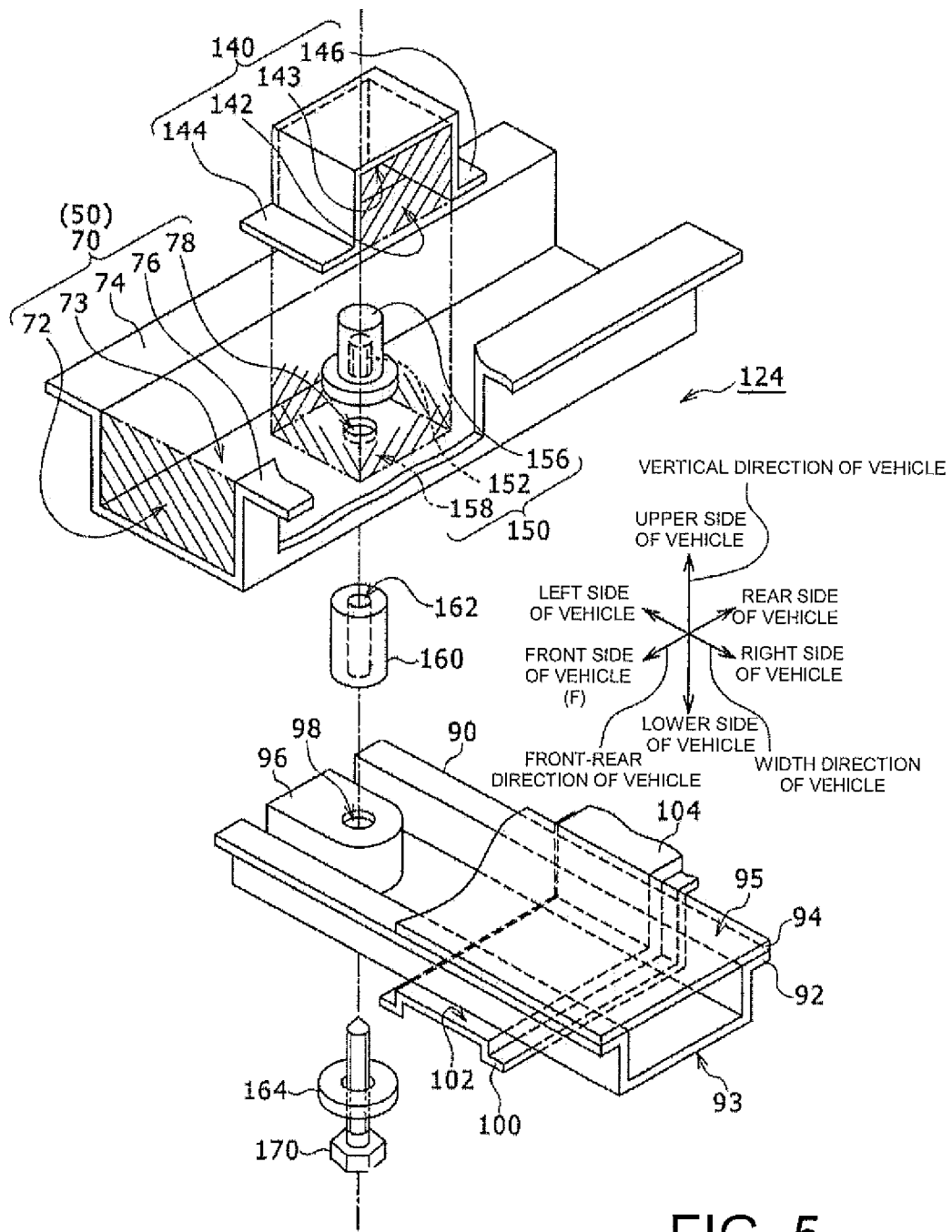
FIG. 5 is a perspective view of a fastening unit.

The relationship between the battery support frame 80 and the other elements will be described in detail with reference to FIGS. 2 to 5. FIG. 2 is an enlarged view of FIG. 1B. FIG. 3 shows the floor panel 28, the left floor member 50, the right floor member 52, and the like, but differs from FIG. 2 in that it excludes the battery support frame 80 and indicates the large-capacity battery 16 with the two-dot chain line. FIG. 4 is a cross-sectional view along line IV-IV' in FIG. 2. FIG. 5 is a perspective view related to one of the multiple fastening units 124.

The left floor member 50 has the left inclined portion 54 inclined toward the outer side of the vehicle from the front of the vehicle toward the rear of the vehicle. As shown in FIG. 5, the left floor member 50 is a hat-shaped structure having a both side flanged groove 72 in cross section. The groove extends in the front-rear direction of the vehicle, and both side flanges 74 and 76 are fixed to the floor panel 28. A structure in this form is referred to as a flanged member structure 70. The groove bottom portion 73 of the flanged member structure 70 has a through hole 78 for fastening. The details of the through hole 78 will be described later in relation to the fastening unit 124 shown in FIG. 5. Fixing between the left floor member 50 and the floor panel 28 is provided by welding. In FIGS. 2 and 3, the welds between the left floor member 50 and the floor panel 28 are represented by black dots.

Similarly, the right floor member 52 has the right inclined portion 56 inclined toward the outer side of the vehicle from the front of the vehicle toward the rear of the vehicle. The right floor member 52 is also a flanged member structure 70 which is a hat-shaped structure having a both side flanged groove in cross section. The groove extends in the front-rear direction of the vehicle, and the both side flanges are fixed to the floor panel 28.

As shown in FIGS. 2 and 3, the left floor member 50 has six fastening units. Three of them are provided in the left inclined portion 54. Here, in the inclined portion of the left inclined portion 54, the inclined left front end 58 is closest to the front side of the vehicle, the inclined left rear end 62 is closest to the rear side of the vehicle, and the inclined left intermediate point 60 is located between the inclined left front end 58 and the inclined left rear end 62. The left inclined portion 54 has a fastening unit 120 at the inclined left front end 58, a fastening unit 122 at the inclined left intermediate point 60 between the inclined left front end 58 and the inclined left rear end 62, and a fastening unit 124 at the inclined left rear end 62. The fastening unit is a fastening bolt 170 (see FIG. 5) but is shown in FIG. 2 as a fastening unit 120 or the like through which the fastening bolt 170 is passed, and is shown in FIG. 3 as an inclined left front end 58 or the like which represents the state seen before the fastening bolt 170 is passed therethrough. In FIGS. 2 and 3, to express fixing using the fastening bolt 170, black dots outlined in white circles represent the inclined left front end 58, the fastening unit 120, and the like.

Similarly, the right floor member 52 has six fastening units. Three of them are provided in the right inclined portion 56. The right inclined portion 56 has a fastening unit 126 at the inclined right front end 64, a fastening unit 128 at the inclined right intermediate point 66 between the inclined right front end 64 and the inclined right rear end 68, and a fastening unit 130 at the inclined right rear end 68.

As indicated by the two-dot chain line in FIG. 3, the large-capacity battery 16 is disposed in the major part of the region between the weld between the left floor member 50 and the floor panel 28 on the inner side of the vehicle and the weld between the right floor member 52 and the floor panel 28 on the inner side of the vehicle. For this reason, the floor panel 28 is barely shown in FIG. 2. In FIG. 3, a part of the large-capacity battery 16 indicated by the two-dot chain line is cut away to show the floor panel 28.

The battery support frame 80 is a truss structural member in which multiple cross members extending in the width direction of the vehicle and multiple straight members extending in the front-rear direction of the vehicle intersect each other and are fixed to each other at the intersections. Three of the multiple cross members provide connections between the left inclined portion 54 and the right inclined portion 56.

The first cross member 86 disposed closest to the front side of the vehicle has a left end portion fixed to the left inclined portion 54 at the inclined left front end 58 through the fastening unit 120, and a right end portion fixed to the right inclined portion 56 at the inclined right front end 64 through the fastening unit 126.

The second cross member 88 disposed next to the first cross member 86 in the rear side of the vehicle has a left end portion fixed to the left inclined portion 54 at the inclined left intermediate point 60 through the fastening unit 122, and a right end portion fixed to the right inclined portion 56 at the inclined right intermediate point 66 through the fastening unit 128.

The third cross member 90 disposed next to the second cross member 88 in the rear side of the vehicle has a left end portion fixed to the left inclined portion 54 at the inclined left rear end 62 through the fastening unit 124, and a right end portion fixed to the right inclined portion 56 at the inclined right rear end 68 through the fastening unit 130.

Since the first cross member 86, the second cross member 88, and the third cross member 90 basically have the same structure, the structure of the third cross member 90 will be described with reference to FIG. 5. The third cross member 90 is a complex member composed of a hat-shaped member 92, which has a both side flanged groove in cross section, and a plate-like member 94. The hat-shaped member 92 and the plate-like member 94 are fixed to each other by welding. An end portion of the hat-shaped member 92 corresponding to the fastening unit 124 is provided with a recessed portion 96 which is recessed toward the upper side of the vehicle to receive the head of the fastening bolt 170 of the fastening unit 124. The depth of the recessed portion 96 is set so that its rear top surface corresponding to the rear side of the recessed portion 96 of the hat-shaped member 92 and present on the upper side of the vehicle comes in contact with the plate-like member 94. The recessed portion 96 and the portion of the plate-like member 94 in contact with it are provided with a through hole 98 through which the male-threaded shaft section of the fastening bolt 170 of the fastening unit 124 is passed.

Although six cross members are disposed more on the rear side of the vehicle than the third cross member 90, these are not fixed to the left inclined portion 54 or the right inclined portion 56 and their detailed description will therefore be omitted.

The multiple straight members are a first straight member 100 disposed on the left side of the vehicle, a second straight member 110 extending along the center line C-C' in the front-rear direction of the vehicle, and a third straight member 112 disposed on the right side of the vehicle.

The first straight member 100, the second straight member 110, and the third straight member 112 intersect multiple cross members, which include the first cross member 86, the second cross member 88, and the third cross member 90, at right angles, and they are fixed to each other by welding.

Since the first straight member 100, the second straight member 110, and the third straight member 112 basically have the same structure, the structure of the first straight member 100 will be described with reference to FIG. 5. The first straight member 100 is a hat-shaped member having a both side flanged groove in cross section, extends in the front-rear direction of the vehicle, and intersects multiple cross members. In FIG. 5, to show the state of intersection with the third cross member 90, the top surface 102 of the hat-shaped member serving as the first straight member 100 is in contact with the top surface 93 of the hat-shaped member 92 of the third cross member 90. As described above, the first straight member 100 extends in the front-rear direction of the vehicle so that the top surface 102 of the hat-shaped member is in contact with the top surface 93 of the hat-shaped member 92 of each cross member. In a section 104 crossing the adjacent cross member, the first straight member 100 is bent toward the upper side of the vehicle so that the top surface 102 of the hat-shaped member is flush with the plate-like member 94 of the cross member. In the example shown in FIG. 5, it is flush with the upper surface 95 of the plate-like member 94 of the third cross member 90. The same applies to the second straight member 110 and the third straight member 112. Thus, the surfaces of the multiple cross members and the multiple straight members, which constitute the battery support frame 80, on the upper side of the vehicle are flush with each other on the same plane forming no asperities, which makes them suitable for supporting the large-capacity battery 16.

As described above, between the left inclined portion 54 and the right inclined portion 56, the first cross member 86, the second cross member 88, and the third cross member 90, and the first straight member 100, the second straight member 110, and the third straight member 112 are fixed to each other. This forms a truss structure. The truss structure has higher flexural rigidity than a simple stick or plate. With the battery support frame 80 having a truss structure, the impact resistance of the left inclined portion 54 and the right inclined portion 56 which are easily bent when receiving an impact such as front collision is improved.

FIG. 4 is a cross-sectional view along line IV-IV' in FIG. 2. FIG. 4 shows the direction IB. FIG. 4 shows the first straight member 100, the second straight member 110, and the third straight member 112, and the third cross member 90 as a cross-sectional view of the battery support frame 80. The third cross member 90 is fixed to the floor panel 28 on the left side of the vehicle through the left floor member 50 with the fastening unit 124, and to the floor panel 28 on the right side of the vehicle through the right floor member 52 with the fastening unit 130. A left upper reinforcement 51 and a right upper reinforcement 53 are members for reinforcing fixing between the floor panel 28 and the left floor member 50 and between the floor panel 28 and the right floor member 52.

Since the fastening unit 124 and the fastening unit 130, and other fastening units 120, 122, 126, and 128 have the same structure, the structure of the fastening unit 124 will be described with reference to FIG. 5. The fastening unit 124 includes a flanged holder 140, a tube nut 150, a collar unit 160, a washer 164, and a fastening bolt 170. FIG. 5 is an exploded perspective view showing these elements in the exploded state.

The flanged holder 140 is a hat-shaped holder having a both side flanged groove 142 in cross section like the flanged member structure 70 serving as the left floor member 50, but differs therefrom in that its groove extends in the direction orthogonal to the direction in which the groove of the flanged member structure 70 extends. Further, the flanged holder 140 differs therefrom in that the both side flanges 144 and 146 are fixed to the groove bottom portion 73 of the flanged member structure 70 and the groove bottom portion 143 therefore faces the lower side of the vehicle. The flanged holder 140 is disposed in the both side flanged groove 72 of the flanged member structure 70 so as to cover the fastening through hole 78 provided in the groove bottom portion 73 of the flanged member structure 70. When the flanged holder 140 is disposed in the both side flanged groove 72 of the flanged member structure 70, a holder space 158 surrounded by the groove wall portion of the flanged holder 140 and the groove wall portion of the flanged member structure 70 is formed, and the fastening through hole 78 is present in the holder space 158.

The tube nut 150 is a tubular longitudinal member in which a female thread portion 152 is threaded along the center axis of the member. The tube nut 150 is disposed so that the female thread portion 152 resides directly above the fastening through hole 78 in the holder space 158. The upper end portion of the tube nut 150 is fixed to the groove bottom portion 143 of the flanged holder 140, and the lower end portion thereof is fixed to the groove bottom portion 73 of the flanged member structure 70. Thus, the upper end portion of the tube nut 150 is fixed to the groove bottom portion 143 of the flanged holder 140 and stands on the groove bottom portion 73 of the flanged member structure 70. Further, the tube nut 150 is prevented from falling in relation to the axial direction by the groove wall portion of the flanged holder 140 and the groove wall portion of the flanged member structure 70 constituting the four-sided wall defining the holder space 158.

In FIG. 5, the tube nut 150 has a flange portion 154 at its lower end portion, the female thread portion 152 does not pass through up to the upper end portion, and its upper end portion has a flat top surface 156. Since this is merely illustrative and the upper end portion is fixed with the groove bottom portion 143 of the flanged holder 140, the female thread portion 152 may pass through up the upper end portion of the tube nut 150. If the surface of the lower end portion fixed by welding is adequately wide, the flange portion 154 may be omitted.

The collar unit 160 is a pipe member having a center hole 162 through which the male-threaded shaft section of the fastening bolt 170 is passed. The collar unit 160 is used to provide a predetermined separation distance along the vertical direction of the vehicle for the left floor member 50 and the third cross member 90 in order to widen the space for containing the large-capacity battery 16. Referring to FIG. 4, when the collar unit 160 is not provided, the distance between the floor panel 28 and the third cross member 90 depends on the height of the left floor member 50 along the vertical direction, narrowing the space for containing the large-capacity battery 16. It is possible that, depending on the circumstances, the large-capacity battery 16 cannot be disposed at all in the space between the left inclined portion 54 and the right inclined portion 56 in which the first cross member 86, the second cross member 88, and the third cross member 90 are disposed. Use of the collar unit 160 having a length within an allowable range based on the specifications of the vehicle 10 widens the space for containing the large-capacity battery 16.

The fastening bolt 170 is a headed bolt having a male-threaded shaft section that passes through the through hole 98 of the third cross member 90, the center hole 162 of the collar unit 160, and the fastening through hole 78 of the left floor member 50, and is screwed into the female thread portion 152 of the tube nut 150. Accordingly, the battery support frame 80 containing the third cross member 90 and the first straight member 100 and the floor panel 28 are fastened and fixed to the left floor member 50 and the right floor member 52. The washer 164 is used for fastening using the fastening bolt 170.

Figure 6:
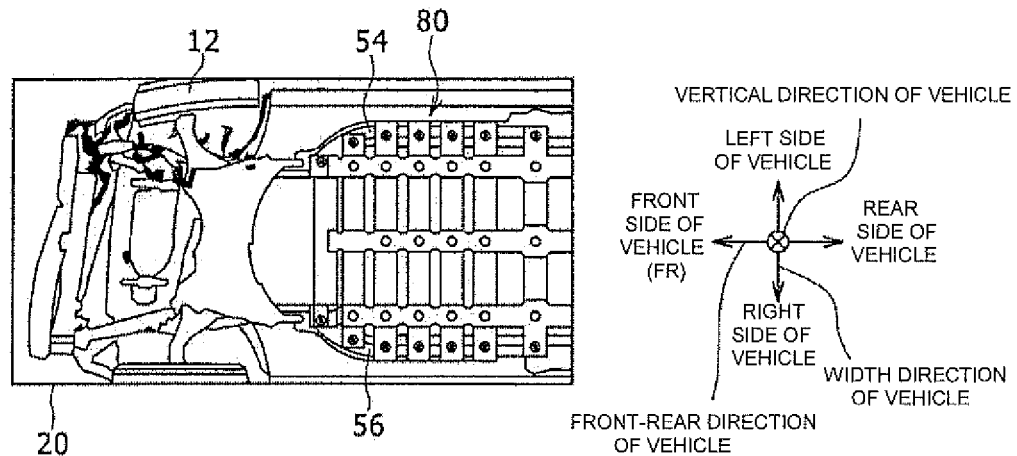
FIG. 6 is a diagram showing the state in the initial stage when receiving front collision, according to the simulation of the case where a vehicle body structure according to an embodiment receives front collision.
Figure 7:
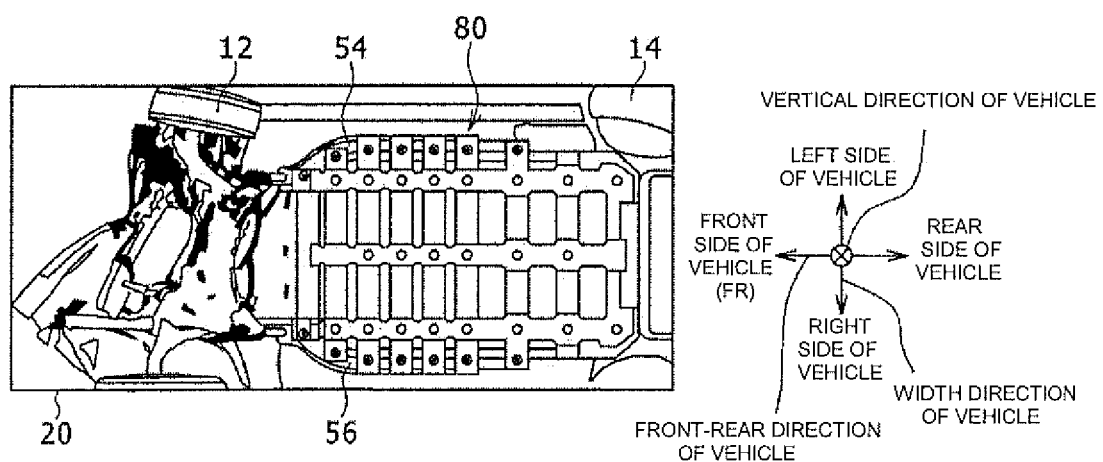
FIG. 7 following

FIGS. 6 and 7 show the results of the simulation of the above-described effects. These drawings were obtained by simulation of the distribution of deformation of the vehicle body structure 20 seen when the vehicle 10 receives an impact of offset collision as front collision. In these drawings, significantly deformed or damaged portions are shaded.

FIG. 6 is a diagram showing the state in the initial stage upon reception of an impact of offset collision, and FIG. 7 following FIG. 6 is a diagram showing the state after reception of the impact of offset collision. In any of the drawings, the significantly deformed or damaged portions concentrate in the area closer to the front of the vehicle than the battery support frame 80, and the portion where the battery support frame 80 is provided is barely deformed or damaged.

As described above, the battery support frame 80 consisting of the multiple cross members and multiple straight members is disposed between the left inclined portion 54 of the left floor member 50 and the right inclined portion 56 of the right floor member 52, so that the impact resistance can be improved.

The invention claimed is:

1. A vehicle body structure comprising:
   a floor panel of a floor of a vehicle interior;
   a left floor member having a left inclined portion inclined toward the outer side of a vehicle from the front of the vehicle toward the rear of the vehicle when viewed from the top, and a right floor member having a right inclined portion inclined toward the outer side of the vehicle from the front of the vehicle toward the rear of the vehicle when viewed from the top;
   a battery support frame closer to the lower side of the vehicle than the left floor member and the right floor member; and a fastening unit for fixing the battery support frame to the floor panel through the left floor member and the right floor member, wherein the battery support frame is fastened to the floor panel at the left inclined portion and the right inclined portion through the fastening unit.

2. The vehicle body structure according to claim 1, wherein the left inclined portion is inclined toward the outer side of the vehicle, between an inclined left front end on the front side of the vehicle and an inclined left rear end on the rear side of the vehicle, and the right inclined portion is inclined toward the outer side of the vehicle, between an inclined right front end on the front side of the vehicle and an inclined right rear end on the rear side of the vehicle, the battery support frame is fixed to the left inclined portion at the inclined left front end, an inclined left intermediate point between the inclined left front end and the inclined left rear end, and the inclined left rear end, and the battery support frame is fixed to the right inclined portion at the inclined right front end, an inclined right intermediate point between the inclined right front end and the inclined right rear end, and the inclined right rear end.

3. The vehicle body structure according to claim 2, wherein the battery support frame comprises:

a first cross member having a left end portion fixed to the inclined left front end, and a right end portion fixed to the inclined right front end;

a second cross member having a left end portion fixed to the inclined left intermediate point, and a right end portion fixed to the inclined right intermediate point;

a third cross member having a left end portion fixed to the inclined left rear end, and a right end portion fixed to the inclined right rear end; and multiple straight members fixed to the first cross member, the second cross member, and the third cross member and extending in the front-rear direction of the vehicle.

4. The vehicle body structure according to claim 1, wherein the left floor member and the right floor member are each a flanged member structure having a hat shape that has, in cross section, a both side flanged groove extending in the front-rear direction of the vehicle, and has a fastening through hole in a groove bottom portion, both side flanges being fixed to the floor panel, the fastening unit comprises:

a flanged holder having the hat shape that has, in cross section, a both side flanged groove extending in a direction orthogonal to a direction in which the groove of the flanged member structure extends, and the both side flanges are fixed to the groove bottom portion of the flanged member structure; and a tube nut that is disposed in a holder space surrounded by a groove wall portion of the flanged holder and a groove wall portion of the flanged member structure and has a female thread portion along an axial direction, and the tube nut has an upper end portion fixed to a groove bottom portion of the flanged holder, and a lower end portion fixed to the groove bottom portion of the flanged member structure.

5. The vehicle body structure according to claim 2, wherein the left floor member and the right floor member are each a flanged member structure having a hat shape that has, in cross section, a both side flanged groove extending in the front-rear direction of the vehicle, and has a fastening through hole in a groove bottom portion, both side flanges being fixed to the floor panel, the fastening unit comprises:

a flanged holder having the hat shape that has, in cross section, a both side flanged groove extending in a direction orthogonal to a direction in which the groove of the flanged member structure extends, and the both side flanges are fixed to the groove bottom portion of the flanged member structure; and a tube nut that is disposed in a holder space surrounded by a groove wall portion of the flanged holder and a groove wall portion of the flanged member structure and has a female thread portion along an axial direction, and the tube nut has an upper end portion fixed to a groove bottom portion of the flanged holder, and a lower end portion fixed to the groove bottom portion of the flanged member structure.

6. The vehicle body structure according to claim 3, wherein the left floor member and the right floor member are each a flanged member structure having a hat shape that has, in cross section, a both side flanged groove extending in the front-rear direction of the vehicle, and has a fastening through hole in a groove bottom portion, both side flanges being fixed to the floor panel, the fastening unit comprises:

a flanged holder having the hat shape that has, in cross section, a both side flanged groove extending in a direction orthogonal to a direction in which the groove of the flanged member structure extends, and the both side flanges are fixed to the groove bottom portion of the flanged member structure; and a tube nut that is disposed in a holder space surrounded by a groove wall portion of the flanged holder and a groove wall portion of the flanged member structure and has a female thread portion along an axial direction, and the tube nut has an upper end portion fixed to a groove bottom portion of the flanged holder, and a lower end portion fixed to the groove bottom portion of the flanged member structure.

* * * * *